US012546970B2

(12) United States Patent
Kimoto et al.

(10) Patent No.: US 12,546,970 B2
(45) Date of Patent: Feb. 10, 2026

(54) LENS BARREL AND CAMERA EQUIPPED WITH SAME

(71) Applicant: Panasonic Intellectual Property Management Co., Ltd., Osaka (JP)

(72) Inventors: Yuichiro Kimoto, Osaka (JP); Tetsuya Morita, Osaka (JP); Masayuki Shodai, Osaka (JP); Naoki Yoshikawa, Osaka (JP); Takeshi Sakakibara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 321 days.

(21) Appl. No.: 18/388,477

(22) Filed: Nov. 9, 2023

(65) Prior Publication Data

US 2024/0168253 A1    May 23, 2024

(30) Foreign Application Priority Data

Nov. 18, 2022   (JP) ................. 2022-184843

(51) Int. Cl.
*G02B 7/02* (2021.01)

(52) U.S. Cl.
CPC .................. *G02B 7/022* (2013.01)

(58) Field of Classification Search
CPC .................................. G02B 7/022
USPC ........................................ 359/827
See application file for complete search history.

(56) References Cited

U.S. PATENT DOCUMENTS

| 11,194,117 B2 | 12/2021 | Fujinaka |
| 2001/0015859 A1* | 8/2001 | Nomura ................. G02B 7/102 |
| | | 359/701 |
| 2019/0331874 A1 | 10/2019 | Yoshikawa |
| 2020/0363604 A1 | 11/2020 | Fujinaka |

FOREIGN PATENT DOCUMENTS

| JP | 2004-117398 A | 4/2004 |
| JP | 6986708 B2 | 12/2021 |
| WO | 2018/139352 A1 | 8/2018 |
| WO | 2019/092921 A1 | 5/2019 |

* cited by examiner

*Primary Examiner* — William Choi
(74) *Attorney, Agent, or Firm* — Renner, Otto, Boisselle & Sklar, LLP

(57) ABSTRACT

A lens barrel 10 comprises a fourth lens group unit 20, cam pins 22a and 22b, a biasing pin 23, a cutout portion C1, a substantially cylindrical first lens group unit 13, and a plurality of rectilinear guide portions 25. The fourth lens group unit 20 has a substantially cylindrical main body portion 21 that holds a lens L4a, etc. The cam pins 22a and 22b are provided to the fourth lens group unit 20, protrude in the radial direction, and engage in the cam grooves 14b of the cam frame 14. The biasing pin 23 is provided to the fourth lens group unit 20, is supported so as to bias in the radial direction, and engages in the cam groove 14b. The cutout portion C1 is formed by cutting out the portion of the main body portion 21 of the fourth lens group unit 20 opposite the biasing pin 23 in the direction of the optical axis. The main body portion 21 of the fourth lens group unit 20 is provided continuously in the circumferential direction, from the biasing pin 23 to the cam pins 22a and 22b.

11 Claims, 12 Drawing Sheets

LENS BARREL AND CAMERA EQUIPPED WITH SAME

CROSS-REFERENCE TO RELATED APPLICATIONS

This application claims priority to Japanese Patent Application No. 2022-184843 filed on Nov. 18, 2022. The entire disclosure of Japanese Patent Application No. 2022-184843 is hereby incorporated herein by reference.

BACKGROUND

Technical Field

The present disclosure relates to a lens barrel and a camera equipped with the same.

Description of the Related Art

Recent years have seen the use of lens barrels that are equipped with an optical system including a plurality of lenses and that are replaceably attached to a camera body.

For example, Patent Literature 1 discloses a lens barrel comprising a cam pin that is fixed to and supported by a lens holding frame, one biasing pin that is supported near the cam pin on the lens holding frame, and a cam frame having cam grooves that engage with the cam pin and the biasing pin respectively.

CITATION LIST

Patent Literature

Patent Literature 1: WO 2019/092921

SUMMARY

Problem to be Solved by the Disclosure

However, the following problem is encountered with the conventional lens barrel described above.

With the lens barrel disclosed in the above publication, the lens holding frame has a substantially cylindrical outer peripheral surface that is formed continuously in the circumferential direction. However, with a lens barrel in which a part of the outer peripheral surface has been cut out in the optical axis direction in order to avoid interference with the lens barrel components, the strength of the lens holding frame is reduced, making this part more susceptible to deformation if subjected to an external force.

If there is deformation of the area around the biasing pin provided in order to suppress looseness, there will be a reaction force from the cam groove in which the biasing pin engages, so there is the risk that the entire lens frame will end up being deformed.

It is an object of the present disclosure to provide a lens barrel, and a camera equipped with this lens barrel, with which the strength of the lens frame can be ensured and deformation of the entire lens frame can be prevented in a shape in which a part of the lens frame is cut out.

Means for Solving Problem

The lens barrel disclosed herein comprises a lens frame, a plurality of first cam pins, a biasing pin, a cutout portion, a substantially cylindrical rectilinear guide tube, and a plurality of rectilinear guide portions. The lens frame has a substantially cylindrical main body portion that holds a lens. The plurality of first cam pins are provided to the lens frame, protrude in a radial direction centered on the optical axis of the lens, and engage with cam grooves formed in the cam frame disposed at opposing positions. The biasing pin is provided to the lens frame, is supported so as to bias in the radial direction, and engages with a cam groove formed in the cam frame. The cutout portion is a part of the main body of the lens frame opposite the biasing pin that has been cut out in the direction of the optical axis. The substantially cylindrical rectilinear guide tube is disposed around the outer periphery of the lens frame and has a plurality of rectilinear guide grooves formed along the direction of the optical axis. The plurality of rectilinear guide portions are provided to the lens frame and move in a state of being engaged with the rectilinear guide grooves of the rectilinear guide tube. The main body portion of the lens frame is provided continuously in the circumferential direction, from the biasing pin to the first cam pins.

(Effects)

With the lens barrel according to the present disclosure, the strength of the lens frame can be ensured and deformation of the entire lens frame can be prevented in a shape in which a part of the lens frame is cut out.

DETAILED DESCRIPTION OF THE EMBODIMENT

An embodiment will now be described in detail with reference to the drawings as appropriate. However, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The applicant has provided the appended drawings and the following description so that a person skilled in the art might fully understand this disclosure, but does not intend for these to limit what is discussed in the patent claims.

Embodiment 1

A lens barrel 10 and a camera 1 equipped with the lens barrel 10 according to an embodiment of the present disclosure will now be described through reference to FIGS. 1 to 13B.

Figure 1:
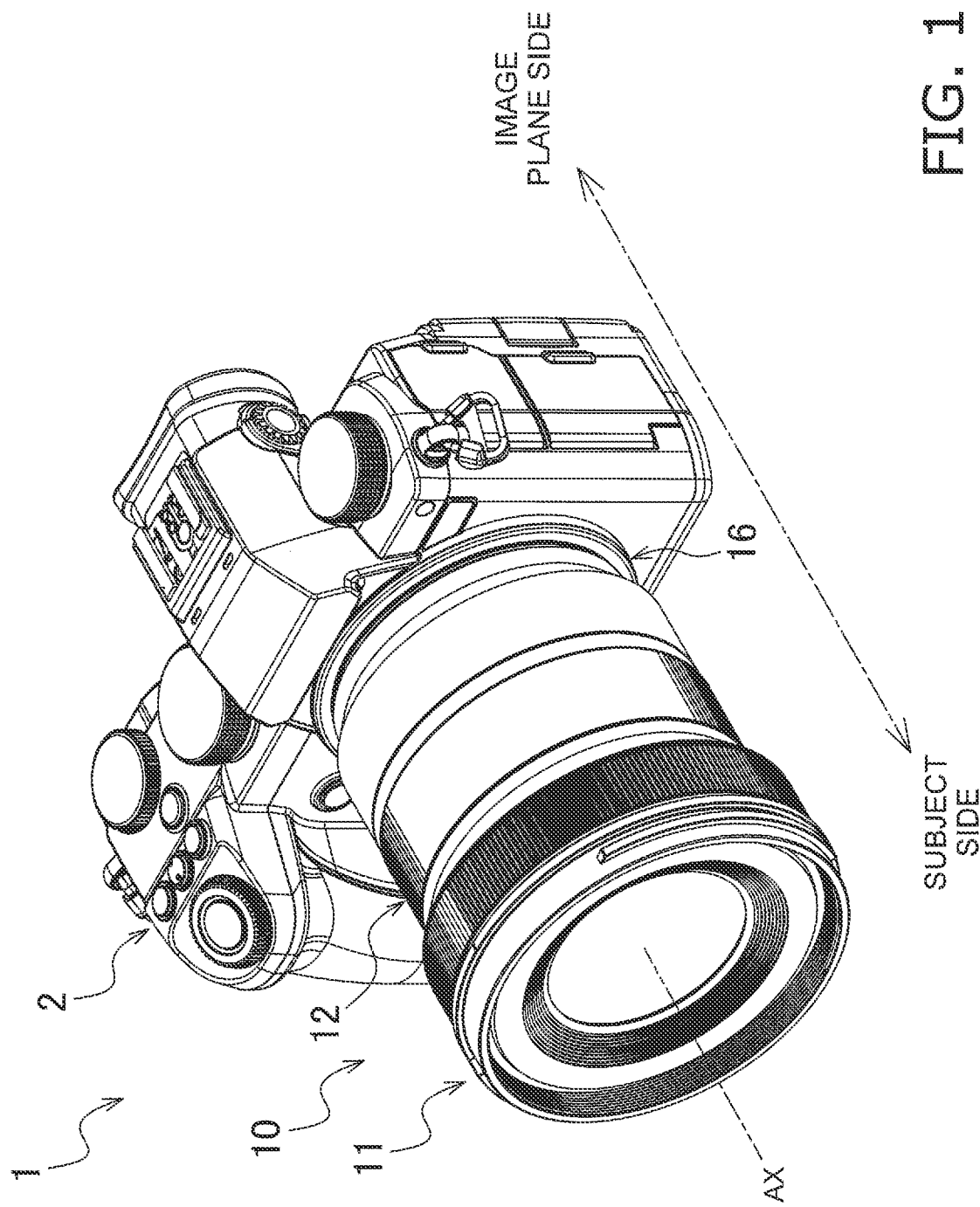
FIG. 1 is an oblique view showing the external configuration of a camera in which the lens barrel according to an embodiment of the present disclosure has been mounted on a camera body.

As shown in FIG. 1, the camera 1 according to this embodiment comprises the lens barrel 10 and a camera body 2 to which the lens barrel 10 is removably attached.
Configuration of Lens Barrel 10

Figure 2:
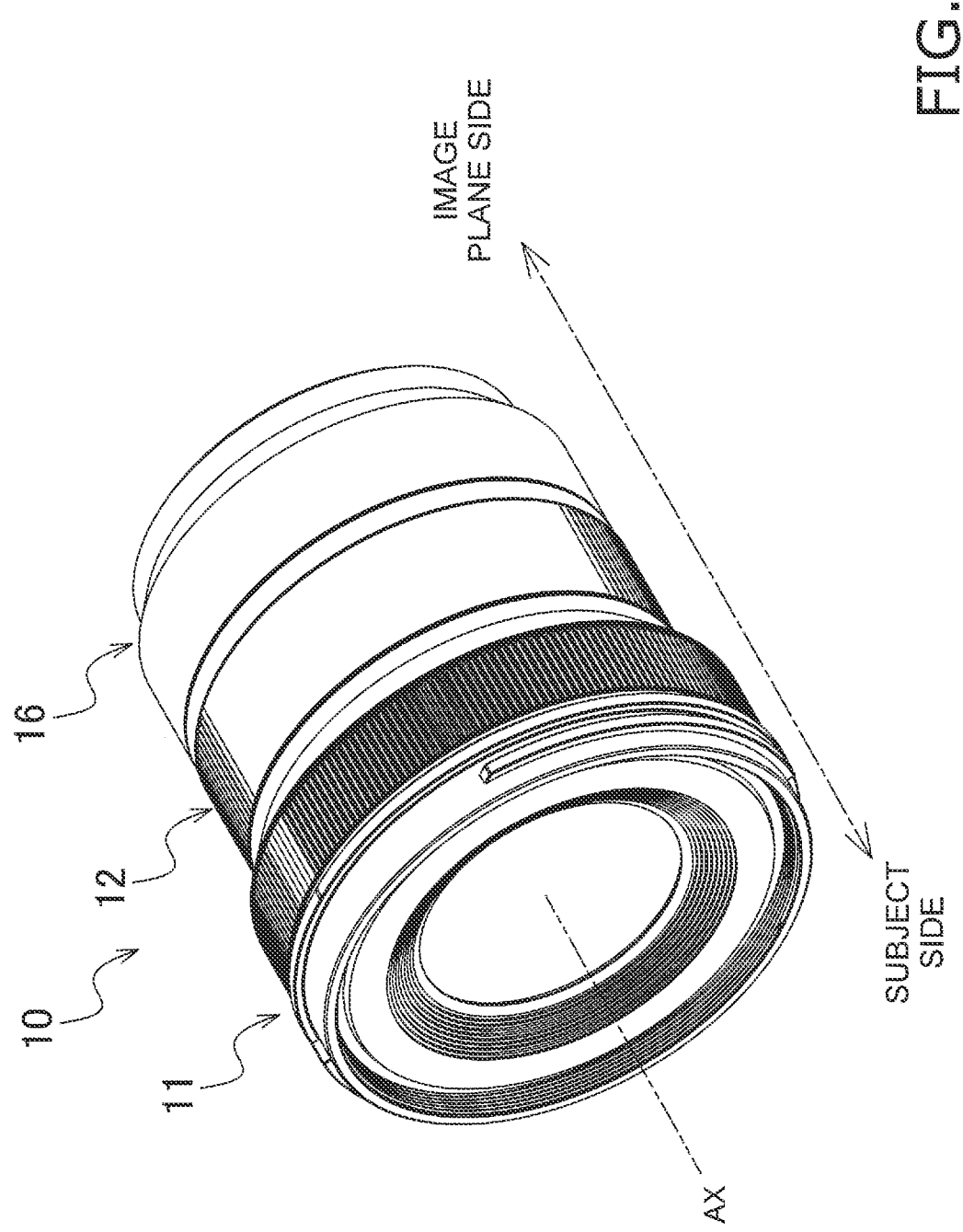
FIG. 2 is an oblique view showing the external configuration of the lens barrel in FIG. 1.
Figure 3:
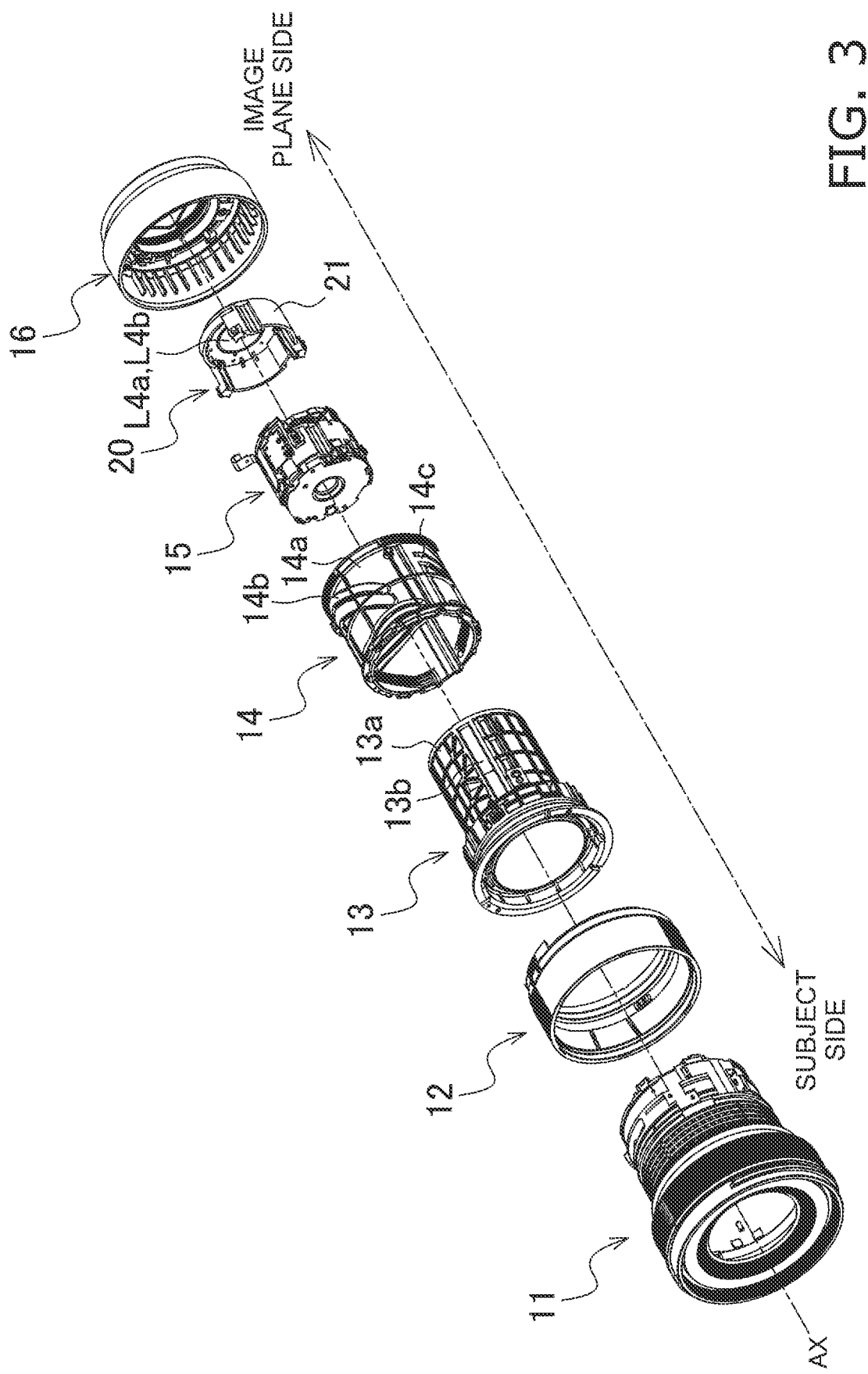
FIG. 3 is an exploded oblique view of the configuration of the lens barrel in FIG. 2.

As shown in FIGS. 2 and 3, the lens barrel 10 comprises a focus ring unit 11, a zoom ring 12, a first lens group unit (rectilinear guide tube) 13, a cam frame 14, a second and third lens group unit 15, a fourth lens group unit (lens frame) 20, and a rear frame 16.

As shown in FIG. 3, the focus ring unit 11 is a substantially cylindrical member that is disposed closest to the subject in the optical axis AX direction of all the parts constituting the lens barrel 10, and the zoom ring 12, which is rotated by the user, is mounted around the outer peripheral surface of this focus ring unit 11.

As shown in FIG. 3, the zoom ring 12 is a substantially annular member that is mounted around the outer circumferential surface of the focus ring unit 11, and is rotated by the user to perform a zoom operation to change the relative positions of the lenses included in the lens barrel 10.

As shown in FIG. 3, the first lens group unit 13 is a substantially cylindrical member that is disposed around the outer peripheral surface of the focus ring unit 11, and holds a first lens group on its inner peripheral surface side.

As shown in FIG. 3, the cam frame 14 is disposed on the outer circumferential surface side of the first lens group unit 13, and has a substantially cylindrical main body portion 14a and a plurality of cam grooves 14b and 14c formed in the main body portion 14a.

As shown in FIG. 3, the second and third lens group unit 15 is a substantially annular member that is included on the inner peripheral surface side of the first lens group unit 13, and holds a second lens group and a third lens group on its inner peripheral surface side. The second and third lens group unit 15 is disposed between the first lens group unit 13 and the fourth lens group unit 20 in the optical axis AX direction of the lens barrel 10.

As shown in FIG. 3, the fourth lens group unit 20 is disposed on the image plane side of the second and third lens group unit 15 in the optical axis AX direction, and holds lenses L4a and L4b on its inner peripheral surface side.

The detailed configuration of the fourth lens group unit 20 will be described below.

As shown in FIG. 3, the rear frame 16 is a substantially cylindrical member that is disposed closest to the image plane in the optical axis AX direction of all the parts constituting the lens barrel 10, and is mounted to a mounting component on the camera body 2 side (not shown).
Configuration of Fourth Lens Group Unit 20

Figure 4A:
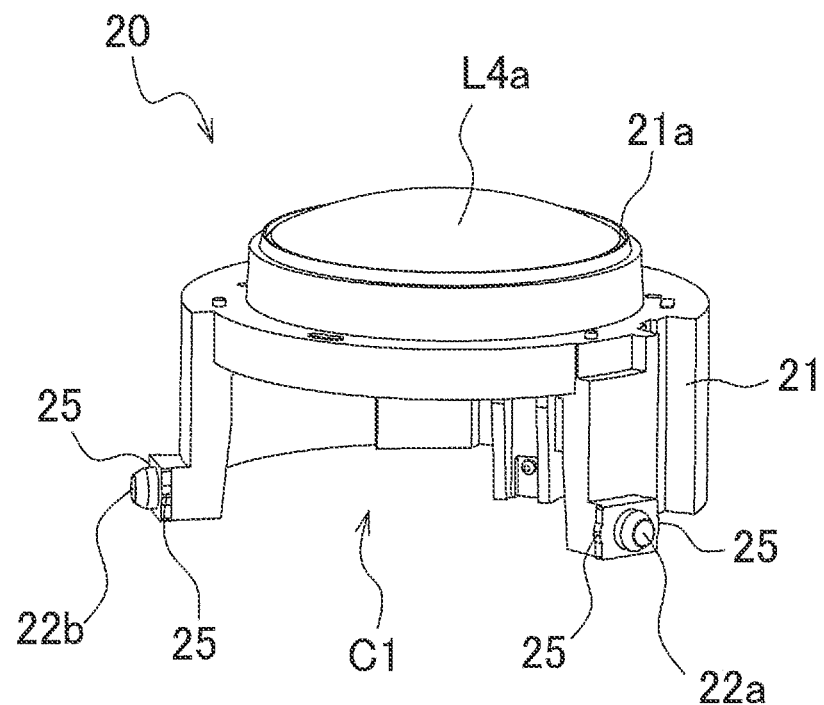
FIG. 4A is an oblique view showing the configuration of the cutout side of the fourth lens group unit included in the lens barrel in FIG. 3.
Figure 4B:
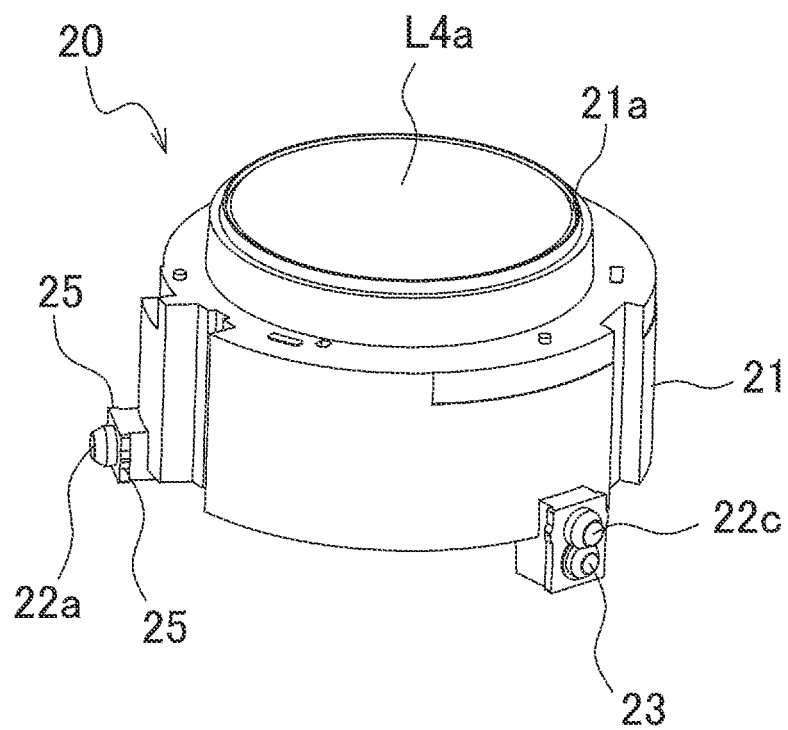
FIG. 4B is an oblique view showing the configuration on the biasing pin side, which is provided on the opposite side from the cutout portion of the fourth lens group unit included in the lens barrel in FIG. 3.

The fourth lens group unit 20 included in the lens barrel 10 of this embodiment is substantially cylindrical and is formed by resin injection molding or the like. As shown in FIGS. 4A and 4B, the fourth lens group unit 20 has a substantially cylindrical main body portion 21, three cam pins 22a, 22b, and 22c, and a biasing pin 23.

The substantially cylindrical main body portion 21 holds the lenses L4a and L4b (see FIG. 5B), constituting the optical system, on its inner peripheral portion (lens holding portion 21a). The main body portion 21 is provided with the cam pins 22a, 22b, and 22c and the biasing pin 23 on its outer peripheral portion. The main body portion 21 is molded integrally with the cam pins 22a, 22b, and 22c by injection molding using a resin.

Figure 5A:
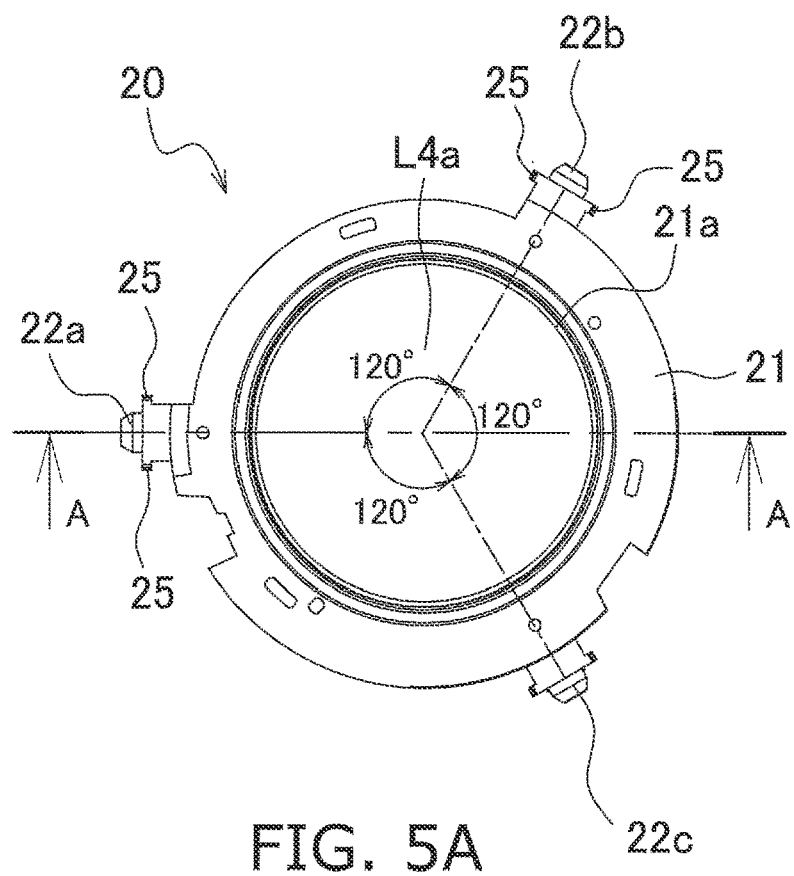
FIG. 5A is a top view of the fourth lens group unit shown in FIG. 4A, etc.

The cam pins 22a, 22b, and 22c have a substantially truncated conical shape and are made of PC (polycarbonate) resin, for example, and as shown in FIG. 5A, these cam pins are provided on the outer peripheral surface the main body portion 21 at substantially equal angular intervals (approximately 120 degrees). Also, the three cam pins 22a, 22b, and 22c are provided on the outer circumferential surface of the main body portion 21 so as to protrude outward in the radial direction of a circle centered on the optical axis AX, engage with cam grooves 14b and 14c formed in the main body portion 14a of the above-mentioned cam frame 14, and move along the cam grooves 14b and 14c. The cam pins 22a, 22b, and 22c are disposed at the end of the main body portion 21 on the subject side in the optical axis AX direction.

Figure 5B:
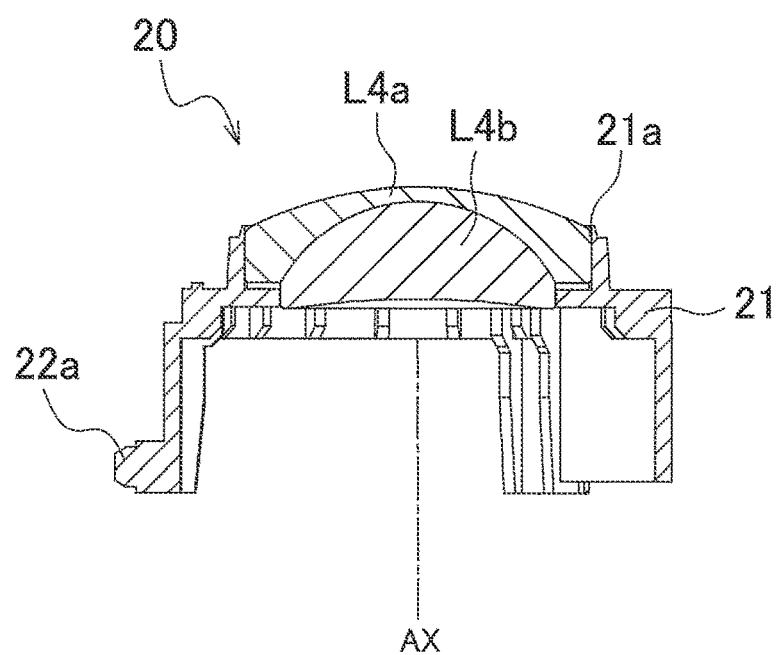
FIG. 5B is a cross-sectional view along the A-A line in FIG. 5A.

As shown in FIGS. 5A and 5B, the cam pin 22a (first cam pin) is provided on the outer peripheral surface of the main body portion 21 so as to protrude outward in the radial direction of a circle centered on the optical axis AX. The cam pin 22a engages with a cam groove 14b provided in the substantially cylindrical main body portion 14a of the cam frame 14 disposed on the outer peripheral surface side of the fourth lens group unit 20.

As shown in FIG. 5A, the cam pin 22b (first cam pin) is provided at a position approximately 120 degrees clockwise from the cam pin 22a on the outer circumferential surface of the main body portion 21, and protrudes outward in the radial direction of a circle centered on the optical axis AX. The cam pin 22b, like the cam pin 22a, engages with a cam groove 14b provided in the substantially cylindrical main body portion 14a of the cam frame 14 disposed on the outer peripheral surface side of the fourth lens group unit 20.

Figure 6A:
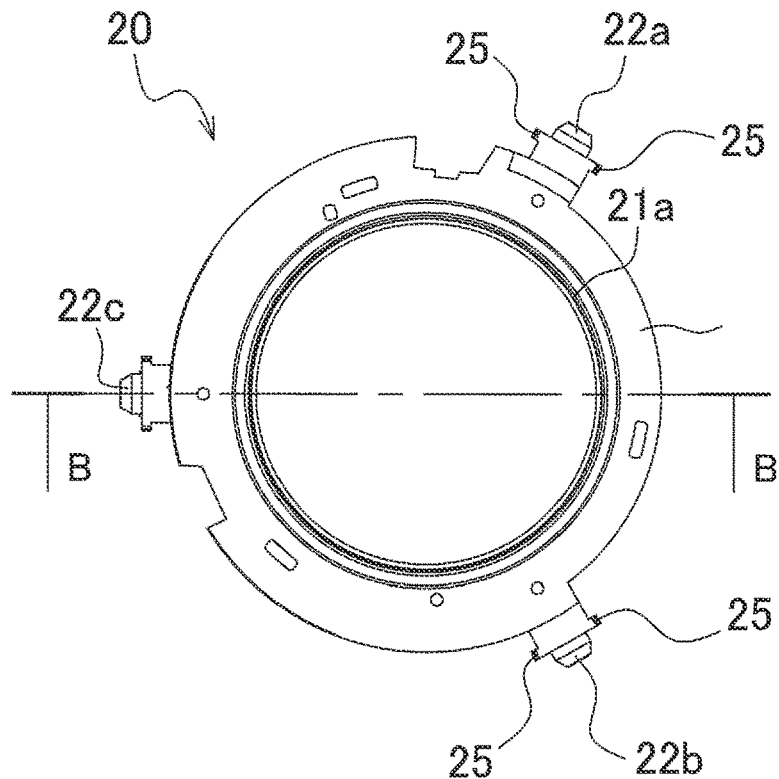
FIG. 6A is a top view of the fourth lens group unit shown in FIG. 4A, etc.
Figure 6B:
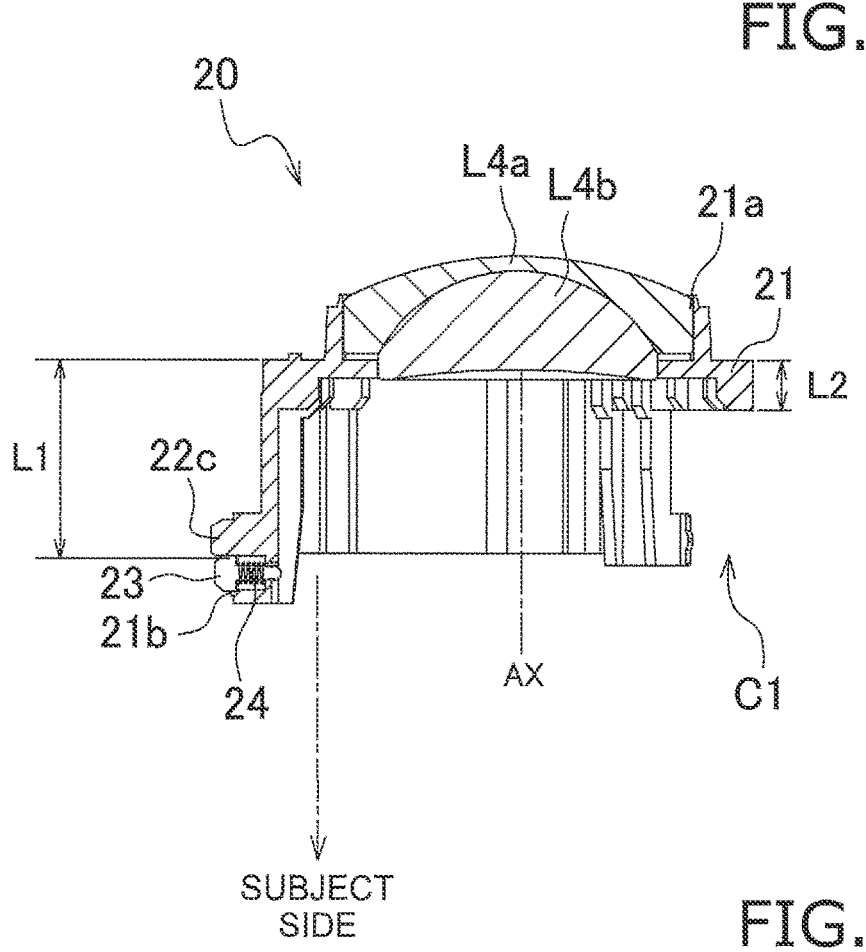
FIG. 6B is a cross-sectional view along the B-B line in FIG. 6A.

As shown in FIGS. 6A and 6B, the cam pin 22c (second cam pin) is provided at a position approximately 120 degrees clockwise from the cam pin 22b on the outer peripheral surface of the main body portion 21, and protrudes outward in the radial direction of a circle centered on the optical axis AX. The cam pin 22c, like the cam pins 22a and 22b, engages with a cam groove 14c provided in the substantially cylindrical main body portion 14a of the cam frame 14 disposed on the outer peripheral surface side of the fourth lens group unit 20.

The biasing pin 23 is provided near the cam pin 22c, of the three resin cam pins 22a, 22b, and 22c provided on the outer peripheral surface of the main body portion 21. More precisely, the biasing pin 23 is disposed adjacent to the cam pin 22c on the subject side in the optical axis AX direction.

The biasing pin 23 is formed by cutting metal (such as stainless steel), and is biased outward in the radial direction from the outer peripheral surface of the fourth lens group unit 20 by a compression coil spring 24. The biasing pin 23 and the cam pin 22c both engage with the cam groove 14c provided in the substantially cylindrical main body portion 14a of the cam frame 14 disposed on the outer peripheral surface side of the fourth lens group unit 20.

Furthermore, as shown in FIG. 6B, the biasing pin 23 is provided at a position that is offset toward the subject side more than the cam pins 22a, 22b, and 22c, whereas the cam pins 22a, 22b, and 22c are provided at approximately the same position in the optical axis AX direction.

The cam pin 22c and the biasing pin 23 are provided at a position opposite the cutout portion C1 provided in the main body portion 21, which is also the position farthest away from the cutout portion C1. Therefore, as shown in FIG. 6B, the length L1 in the optical axis AX direction of the outer circumferential surface of the main body portion 21 where the cam pin 22c and the biasing pin 23 are provided is greater than the length L2 of the outer circumferential surface at an opposing position.

That is, the biasing pin 23 and the cam pin 22c disposed adjacent thereto are provided to a portion of the main body portion 21 of the fourth lens group unit 20 that is very rigid.

Figure 7A:
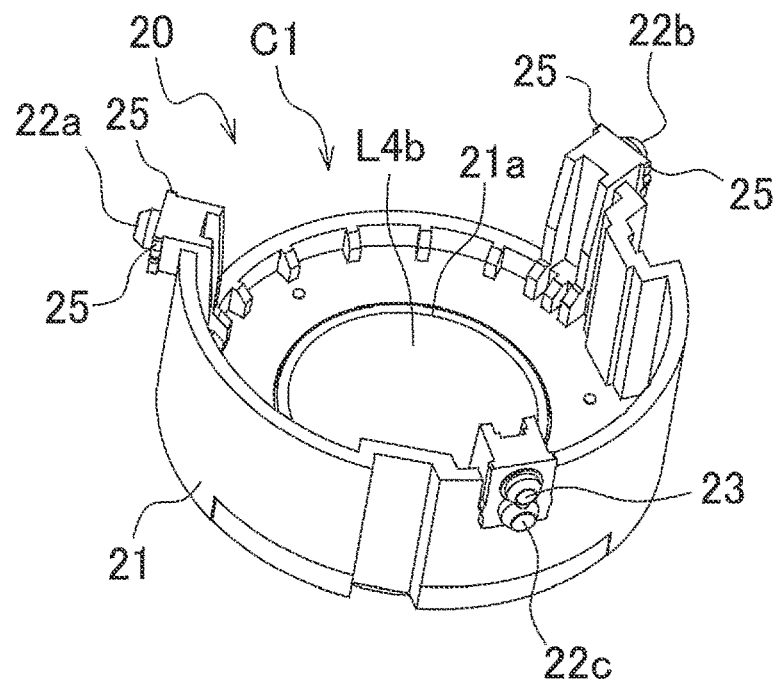
FIG. 7A is an oblique view showing the configuration of the biasing pin side of the fourth lens group unit shown in FIG. 4A, etc.
Figure 7B:
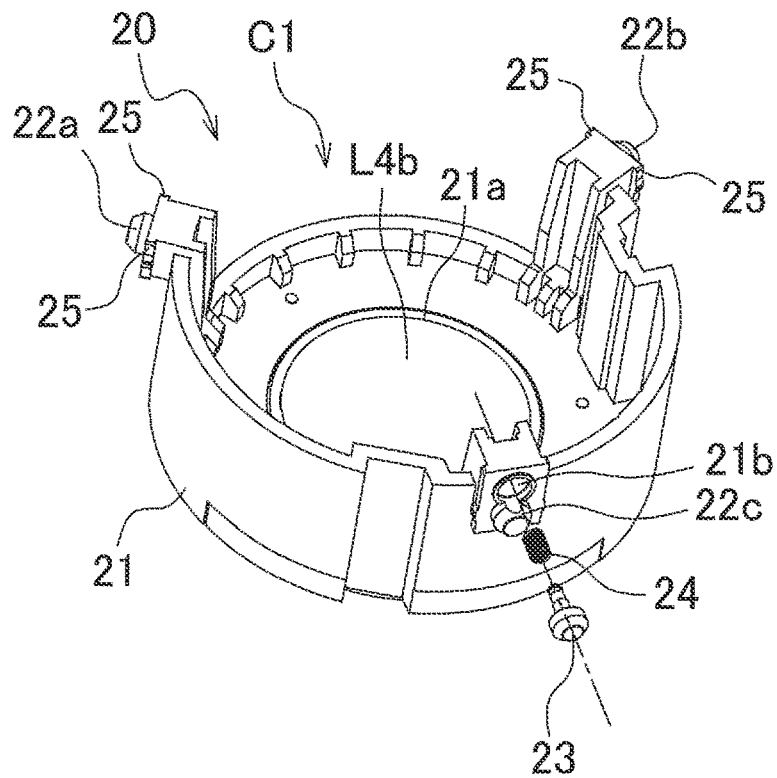
FIG. 7B is an exploded oblique view of the biasing pin in FIG. 7A.

As shown in FIG. 7B, the biasing pin 23 is attached via the compression coil spring 24 to an attachment hole 21b provided at a position adjacent to the cam pin 22c in the optical axis AX direction on the outer peripheral surface of the main body portion 21.

The compression coil spring 24 is inserted into the attachment hole 21b and in this state is disposed between the attachment hole 21b and the biasing pin 23. When the biasing pin 23 is attached to the attachment hole, the compression coil spring 24 is compressed, and the biasing pin 23 applies a biasing force outward in the radial direction.

Here, with the lens barrel 10 in this embodiment, as shown in FIGS. 7A and 7B, the substantially cylindrical main body portion 21 of the fourth lens group unit 20 has the cutout portion C1, which is formed as if cut out in the optical axis AX direction, between the cam pin 22a and the cam pin 22b.

Meanwhile, the main body portion 21 is attached continuously in the circumferential direction, from the cam pin 22a to the biasing pin 23, and is provided continuously in the circumferential direction from the cam pin 22b to the biasing pin 23.

Here, "continuous" refers to a state in which the outer circumferential surface of the main body portion 21 is continuous from the biasing pin 23 to the cam pins 22a and 22b, and the outer circumferential surface is uninterrupted in the circumferential direction by any recesses, cutouts, etc. Consequently, a configuration in which a recess, a cutout, or the like is provided at the end of the outer peripheral surface of the main body portion 21 in the optical axis AX direction is included in the concept of being "continuously provided."

As a result, near the position where the biasing pin 23 is provided in the main body portion 21 is more rigid than the positions where the cam pins 22a and 22b are provided, and is less likely to deform when subjected to an external force.

Consequently, even with a shape in which part of the main body portion 14a of the fourth lens group unit 20 is cut out to prevent interference with other components, the strength of the fourth lens group unit 20 can be ensured and deformation of the entire fourth lens group unit 20 can be prevented.

Figure 8A:
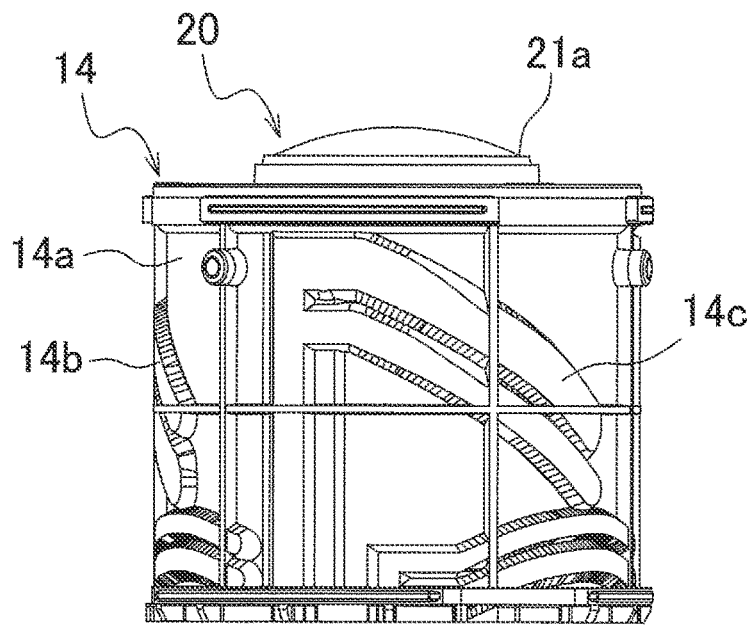
FIG. 8A is a see-through view showing the relation between the cam pin provided to the fourth lens group unit and the cam frame disposed on the outer peripheral side of the fourth lens group unit in FIG. 4A, etc.
Figure 8B:
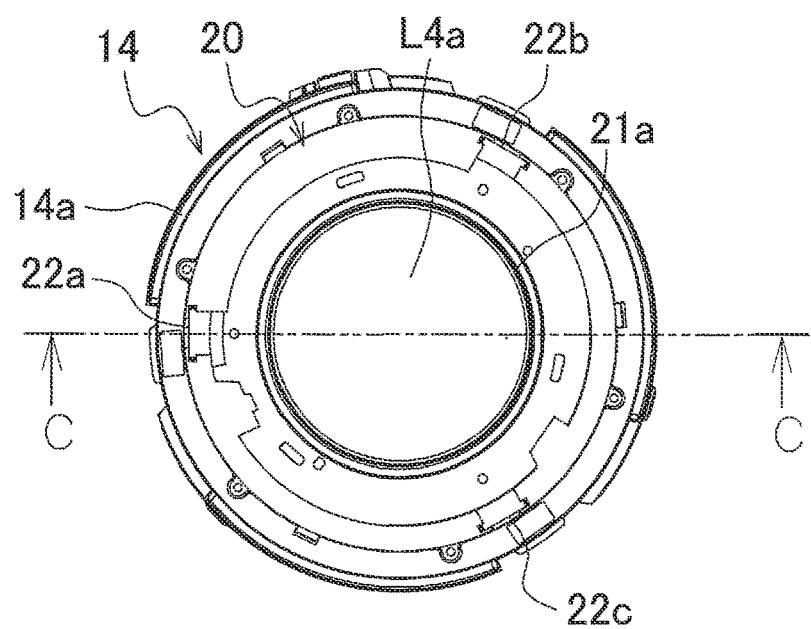
FIG. 8B is a top view of the state when the fourth lens group unit and the cam frame shown in FIG. 8A have been assembled.

Here, as shown in FIGS. 8A and 8B, when the fourth lens group unit 20 is mounted on the inner peripheral surface side of the cam frame 14, the cam pins 22a and 22b are engaged in the cam groove 14b of the cam frame 14, and the cam pin 22c and the biasing pin 23 are engaged in the cam groove 14c.

Figure 9:
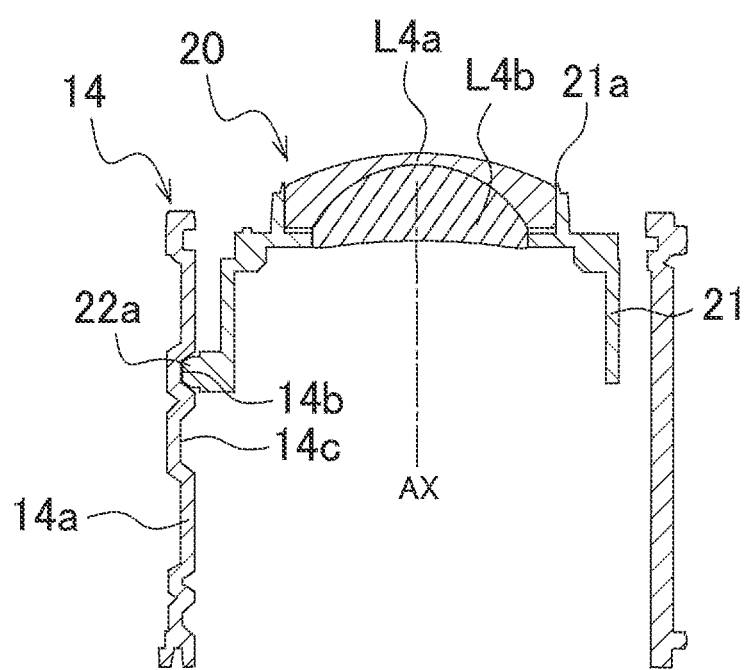
FIG. 9 is a cross-sectional view along the C-C line in FIG. 8B.

At this point, as shown in FIG. 9, the resin cam pins 22a, etc., are engaged with the cam grooves 14b and 14c of the cam frame 14, and when the cam frame 14 rotates around the optical axis AX, the cam pins 22a, 22b, and 22c engaged in the cam grooves 14b and 14c move along the cam grooves 14b and 14c, and as a result the fourth lens group unit 20 moves back and forth in the optical axis AX direction with respect to the cam frame 14.

Figure 10A:
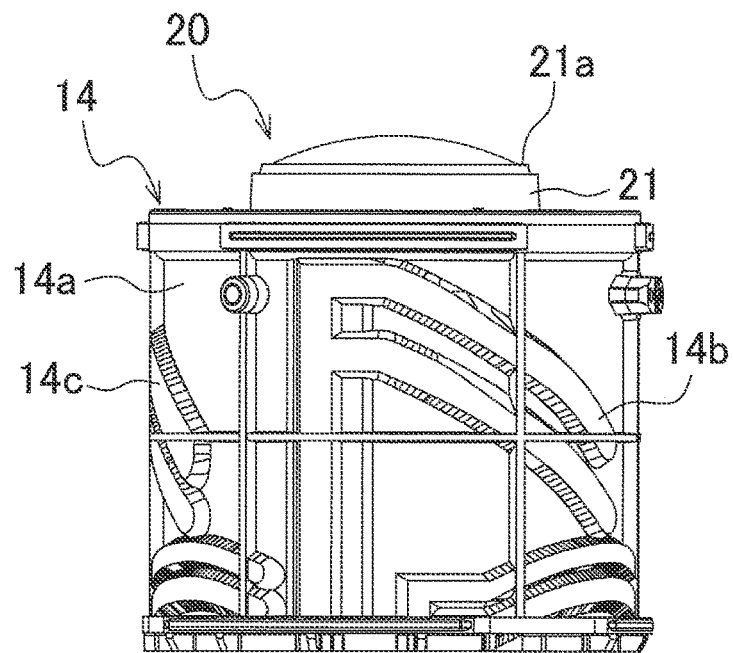
FIG. 10A is an oblique view showing the relation between the biasing pin and cam pin provided to the fourth lens group unit and the cam frame disposed on the outer peripheral side of the fourth lens group unit in FIG. 4A, etc.
Figure 10B:
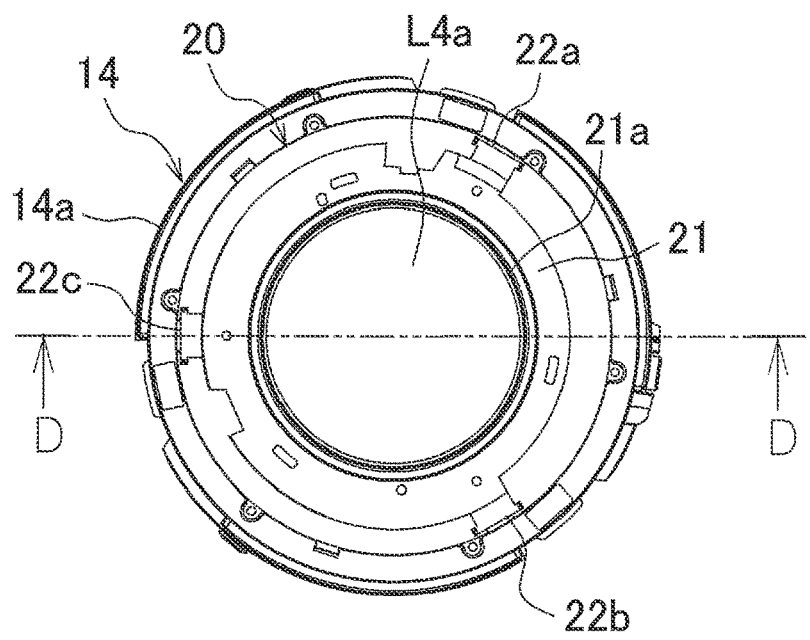
FIG. 10B is a top view of the state when the fourth lens group unit and the cam frame in FIG. 10A have been assembled.
Figure 11:
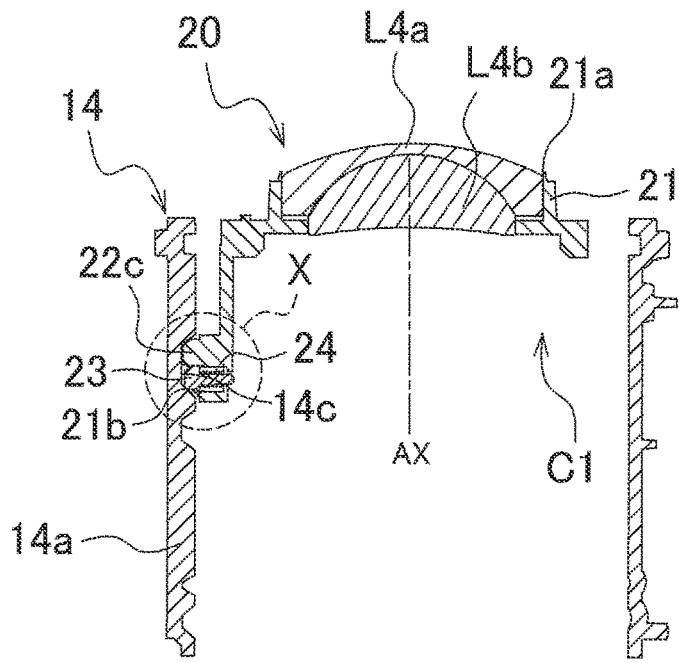
FIG. 11 is a cross-sectional view along the D-D line in FIG. 10B.

Meanwhile, the biasing pin 23 protrudes outward in the radial direction and is biased outward in the radial direction by the compression coil spring 24. Therefore, as shown in FIGS. 10A and 10B, when the fourth lens group unit 20 is mounted on the inner peripheral surface side of the cam frame 14, as shown in FIG. 11, a biasing force is exerted in a state of engagement with the cam groove 14c, which is wider than the cam groove 14c, along with the cam pins 22c that is disposed adjacent, and this makes it less likely that there will be looseness in the fourth lens group unit 20 with respect to the cam frame 14.

Figure 12:
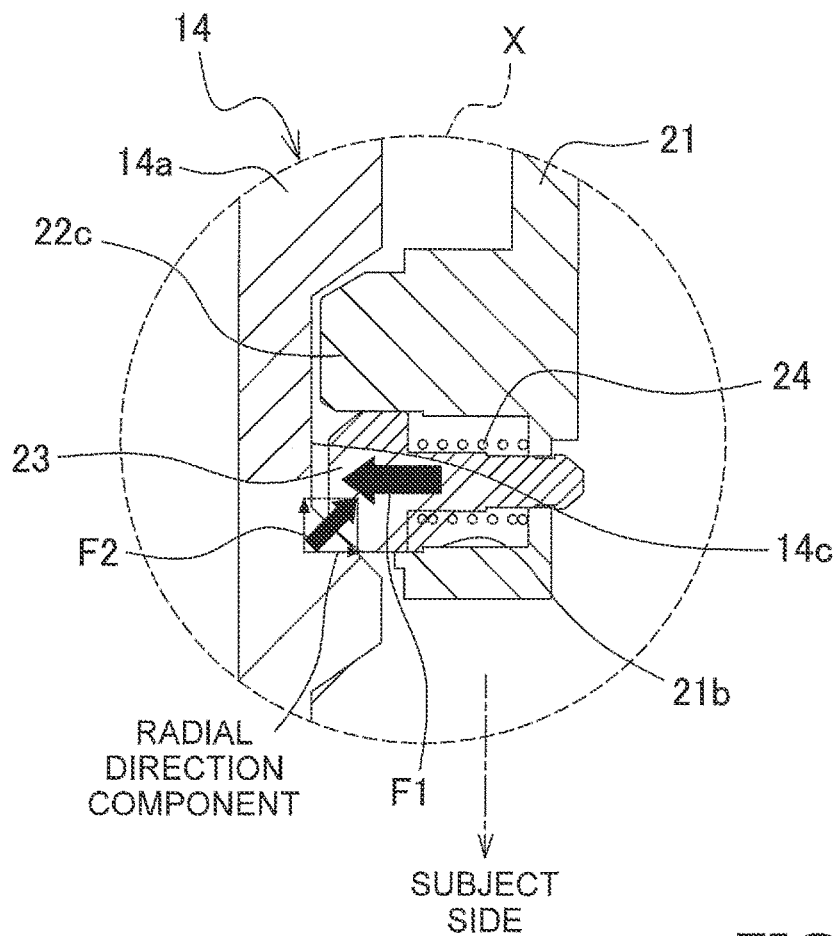
FIG. 12 is a detail view of the X portion in FIG. 11.

Here, as shown in FIG. 12, in the fourth lens group unit 20, the compression coil spring 24 causes the biasing pin 23 to exert a biasing force F1 outward in the radial direction, the result being that the biasing pin 23 is always subjected to a reaction force F2 from the cam groove 14c.

That is, because the biasing pin 23 exerts the biasing force F1 in the radial direction in the fourth lens group unit 20, the cutout portion C1 is provided in the direction of the radial component of the reaction force F2 received from the cam groove 14c.

Consequently, in a configuration in which the cutout portion C1 is provided in the main body portion 21 of the fourth lens group unit 20, even though the biasing pin 23 is always subjected to the reaction force F2 from the cam groove 14c, the biasing pin 23 is provided at a position where it is less susceptible to the effect of providing the cutout portion C1, and where rigidity is higher and deformation is less likely to occur.

In other words, the biasing pin 23 is disposed at the position farthest away from the position where rigidity is likely to decrease due to the influence of the cutout portion C1. Accordingly, the fourth lens group unit 20 can be driven with respect to the cam frame 14 almost without being affected by a decrease in rigidity due to the cutout portion C1.

Figure 13A:
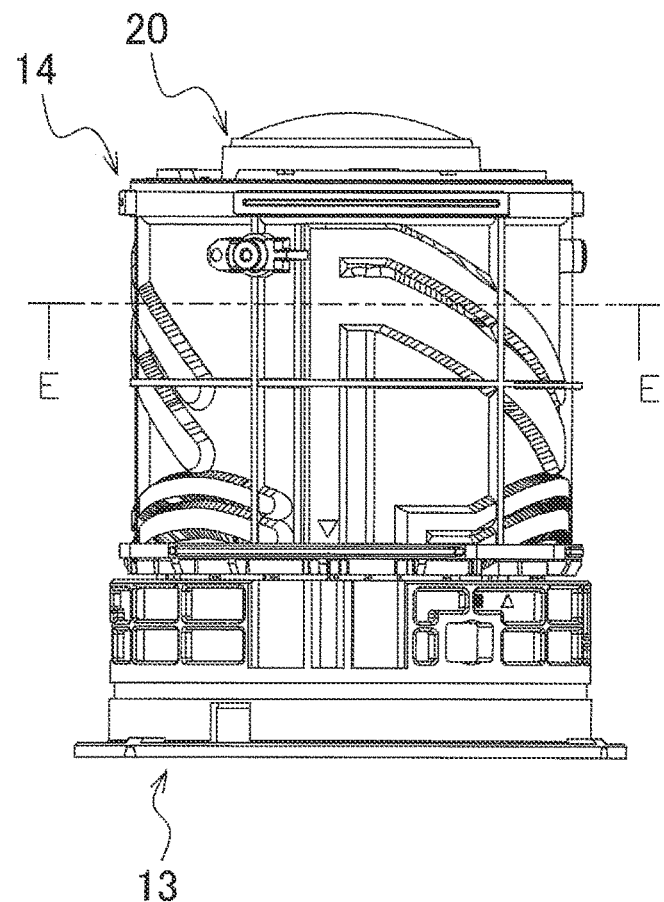
FIG. 13A is a side view showing the state when the fourth lens group unit in FIG. 10A is mounted along with a first lens group unit on the inner peripheral side of the cam frame.

FIG. 13A shows a state in which the first lens group unit 13 and the fourth lens group unit 20 have been mounted on the inner peripheral side of the cam frame 14.

Figure 13B:
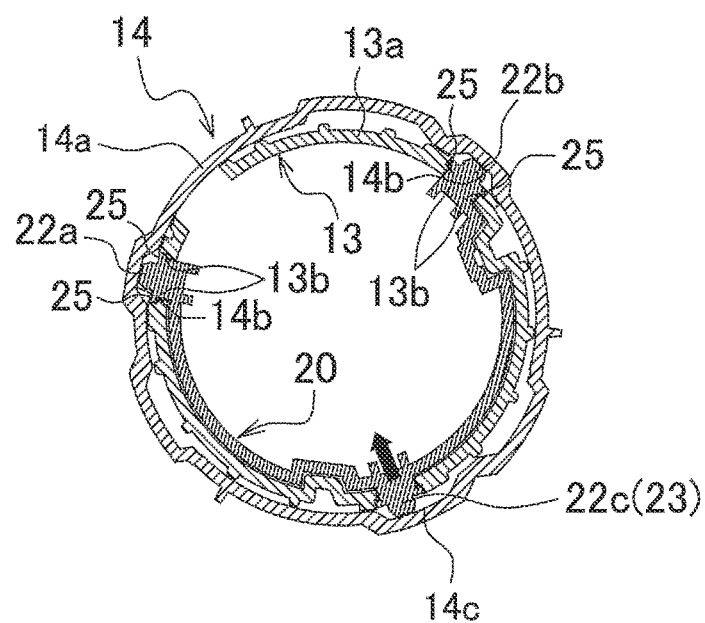
FIG. 13B is a cross-sectional view along the E-E line in FIG. 13A.

In this state, when a biasing force outward in the radial direction is exerted by the biasing pin 23, the entire fourth lens group unit 20 is biased in the direction indicated by the arrow shown in FIG. 13B by reaction force from the bottom surface of the cam groove 14c of the cam frame 14.

At this point, as shown in FIG. 13B, the rectilinear guide portions 25 provided at the root portions of the cam pins 22a and 22b are held in a state of being the engaged with the rectilinear guide grooves 13b formed in the main body 13a of the first lens group unit 13 along the optical axis direction.

As a result, the portions around the cam pins 22a and 22b (rectilinear guide portions 25) disposed near the cutout portion C1 of the fourth lens group unit 20 are held so that movement in the tangential direction substantially cylindrical fourth lens group unit 20 is restricted by the rectilinear guide grooves 13b of the first lens group unit 13.

Consequently, even when the fourth lens group unit 20 is biased in the direction of the arrow shown in FIG. 13B, the cam pins 22a and 22b provided near the cutout portion C1 are supported in the tangential direction by the rectilinear guide portions 25, and are also supported in the radial direction by the cam grooves 14b of the cam frame 14, which prevents damage, etc., to the periphery of the cam pins 22a and 22b.

Main Features

The lens barrel 10 of this embodiment comprises the substantially cylindrical fourth lens group unit 20 holding lenses the L4a and L4b; the cam pins 22a and 22b; the biasing pin 23; the cutout portion C1; the substantially cylindrical first lens group unit 13, and the plurality of rectilinear guide portions 25. The cam pins 22a and 22b are provided to the fourth lens group unit 20, protrude in the radial direction centered on the optical axis of the lenses L4a and L4b, and engage with the cam grooves 14b of the cam frame 14. The biasing pin 23 is provided to the fourth lens group unit 20, is supported so as to be biased in the radial direction, and engages with the cam groove 14c of the cam frame 14. The cutout portion C1 is formed by cutting out the part of the outer peripheral surface of the fourth lens group unit 20 that is opposite the biasing pin 23 in the optical axis direction. The outer peripheral surface of the fourth lens group unit 20 is provided continuously in the circumferential direction, from the biasing pin 23 to the cam pins 22a and 22b. The substantially cylindrical first lens group unit 13 is disposed on the outer periphery of the fourth lens group unit 20, and has the plurality of rectilinear guide grooves 13b formed along the optical axis direction. The plurality of rectilinear guide portions 25 are provided to the fourth lens group unit 20 and move in a state of being engaged with the rectilinear guide grooves 13b of the first lens group unit 13.

Consequently, in a state in which the biasing pin 23 that exerts a biasing force in the radial direction while engaged with the cam groove 14c of the cam frame 14 is always subjected to a reaction force from the surface of the cam groove 14c, and the periphery of the biasing pin 23 is disposed at the position farthest away from the open portion (the cutout portion C1).

Therefore, the rigidity of the main body portion 21 near where the biasing pin 23 is provided can be maintained at about the same level as that with a conventional configuration having no cutout portion C1.

As a result, in a shape in which the main body portion 14a of the fourth lens group unit 20 is partially cut out, the strength of the fourth lens group unit 20 can be ensured and deformation of the entire fourth lens group unit 20 can be prevented.

Other Embodiments

An embodiment of the present disclosure was described above, but the present disclosure is not limited to or by the above embodiment, and various changes can be made without departing from the gist of the disclosure.

(A)

In the above embodiment, an example was given in which the cam pin 22c and the biasing pin 23 were disposed at adjacent positions in the optical axis AX direction in the main body portion 21 of the fourth lens group unit 20. However, the present disclosure is not limited to this.

For example, the lens barrel may be such that a cam pin (second cam pin) is not provided at a position adjacent to the biasing pin.

Alternatively, the configuration may be such that the biasing pin and the cam pin (second cam pin) are separated from each other, rather than being provided at adjacent positions.

(B)

In the above embodiment, an example was given in which in which the biasing pin 23 was provided at a position protruding toward the subject in the optical axis AX direction on the outer circumferential surface of the main body portion 21. However, the present disclosure is not limited to this.

For example, the configuration may be such that the biasing pin is provided within the range of the substantially cylindrical outer peripheral surface of the main body portion.

(C)

In the above embodiment, an example was given in which the biasing pin 23 was provided at a position offset in the optical axis AX direction from the positions where the other cam pins 22a, 22b, and 22c were provided. However, the present disclosure is not limited to this.

For example, the configuration may be such that the biasing pin is located at substantially the same position as the other cam pins in the optical axis direction.

(D)

In the above embodiment, an example was given in which the cam pins 22a and 22b and the cam pin 22c were formed from resin. However, the present disclosure is not limited to this.

For example, the material of the cam pins may be something other than a resin.

(E)

In the above embodiment, an example was given in which the biasing pin 23 was made of metal. However, the present disclosure is not limited to this.

For example, the material of the biasing pin may be something other than a metal.

(F)

In the above embodiment, an example was given in which the configuration of the present disclosure was applied to an interchangeable lens that can be attached to and detached from a camera body. However, the present disclosure is not limited to this.

For example, the configuration of the present disclosure may be applied to a lens barrel that is fixed to a camera body in a non-removable state.

INDUSTRIAL APPLICABILITY

The lens barrel of the present disclosure exhibits the effect that the strength of the lens frame can be ensured and deformation of the entire lens frame can be prevented in a shape in which a part of the lens frame is cut out, and as such can be widely applied to lens barrels that are mounted on various kinds of imaging device.

REFERENCE SIGNS LIST 1 camera
2 camera body
10 lens barrel
11 focus ring unit
12 zoom ring
13 first lens group unit
13a main body portion
13b rectilinear guide groove
14 cam frame
14a main body portion
14b cam groove
14c cam groove
15 second and third lens group unit
16 rear frame
20 fourth lens group unit (lens frame)
21 main body portion
21a lens holding portion
21b attachment hole
22a, 22b cam pin (first cam pin)
22c cam pin (second cam pin)
23 biasing pin
24 compression coil spring
25 rectilinear guide portion
AX optical axis
C1 cutout portion
F1 biasing force
F2 reaction force
L1, L2 length
L4a, L4b lens

The invention claimed is:

1. A lens barrel, comprising:
a lens frame that has a substantially cylindrical main body portion for holding a lens;
a plurality of first cam pins that are provided to the lens frame, protrude in a radial direction centered on an optical axis of the lens, and engage in cam grooves formed in a cam frame disposed at opposing positions;
a biasing pin that is provided to the lens frame, is supported so as to bias in the radial direction, and engages in one of the cam grooves formed in the cam frame;
a cutout portion where a part of the main body portion of the lens frame opposite the biasing pin is cut out in a direction of the optical axis;
a substantially cylindrical rectilinear guide tube that is disposed on an outer periphery of the lens frame and has a plurality of rectilinear guide grooves formed along the direction of the optical axis; and
a plurality of rectilinear guide portions that are provided to the lens frame and move in a state of being engaged with the rectilinear guide grooves of the rectilinear guide tube,
wherein the main body portion of the lens frame is provided continuously in a circumferential direction, from the biasing pin to the first cam pins.

2. The lens barrel according to claim 1,
wherein the cutout portion is provided in the lens frame in the direction of a radial component of a reaction force received from the cam groove when the biasing pin is biased in the radial direction.

3. The lens barrel according to claim 1,
further comprising a second cam pin that is provided to the lens frame, protrudes in the radial direction, and engages in a cam groove formed in the cam frame.

4. The lens barrel according to claim 3,
wherein the second cam pin is disposed adjacent to the biasing pin in the direction of the optical axis.

5. The lens barrel according to claim 4,
wherein a portion of the lens frame where the second cam pin and the biasing pin are provided is longer in the direction of the optical axis than a portion where the cutout is provided.

6. The lens barrel according to claim 1,
wherein the first cam pin is formed from a resin.

7. The lens barrel according to claim 1,
wherein the biasing pin is formed from a metal material.

8. The lens barrel according to claim 3,
wherein the second cam pin is formed from a resin.

9. The lens barrel according to claim 1,
wherein the plurality of first cam pins are disposed at approximately equal angular intervals in the circumferential direction of the main body portion of the lens frame.

10. The lens barrel according to claim 1,
wherein the biasing pin is provided at a position that is offset from the first cam pin in a direction of the optical axis.

11. A camera, comprising:
the lens barrel according to claim 1; and
a camera body to which the lens barrel is attached.

* * * * *